C. F. BURROUGHS.
TILTING HEAD FOR MOLDING PRESSES.
APPLICATION FILED FEB. 7, 1918.

1,308,475.

Patented July 1, 1919.
5 SHEETS—SHEET 1.

Inventor.
Charles F. Burroughs
per Wm. T. Crane, Atty.

C. F. BURROUGHS.
TILTING HEAD FOR MOLDING PRESSES.
APPLICATION FILED FEB. 7, 1918.

1,308,475.

Patented July 1, 1919.
5 SHEETS—SHEET 4.

UNITED STATES PATENT OFFICE.

CHARLES F. BURROUGHS, OF EAST ORANGE, NEW JERSEY.

TILTING HEAD FOR MOLDING-PRESSES.

1,308,475. Specification of Letters Patent. Patented July 1, 1919.

Application filed February 7, 1918. Serial No. 215,822.

*To all whom it may concern:*

Be it known that I, CHARLES F. BURROUGHS, a citizen of the United States, residing at 122 Prospect street, East Orange, county of Essex, and State of New Jersey, have invented certain new and useful Improvements in Tilting Heads for Molding-Presses, fully described and represented in the following specification and the accompanying drawings, forming a part of the same.

This invention relates to that class of presses in which plastic material is molded in a mold which requires to be heated and cooled, to soften and harden the material respectively, before and after the pressing operation.

Such presses have sometimes been provided with molds heated independently of the press by means of a hot plate heated by steam, or the head of the press in which the mold is fitted has been provided with channels through which steam and water could be circulated at pleasure to heat and cool the mold.

The use of a steam-plate has proved unsatisfactory because the molds do not retain the heat during the shifting of the mold from the hot plate to the press, and the press itself, in such constructions, often operates to chill the mold before the pressure can be applied to press its contents.

In many hydraulic presses in which one-half of a mold is set upon a bed, and the other half is pressed thereon by a movable head, the lower half of the mold can only be removed from its seat in the press when the upper half or cope of the mold is lifted sufficiently by the movable head of the press, but this does not render the upper half of the mold readily accessible, and access to it is very desirable for the purpose of cleaning or brushing off its surface before pressing the material again in the mold.

Furthermore, where a relatively small number each of several articles is required, the molds have to be frequently changed in the press to mold the different articles.

Where the upper half of the mold is secured in the head of the press in an inverted position, at least half an hour's time is lost in changing each mold by taking out the mold-parts and securing others in the press in readiness to mold a different article.

The object of the present invention is partly to facilitate the heating and cooling of the mold so that the material placed in the mold may be quickly softened to receive the impression and may be quickly cooled after the pressure is applied; partly, to facilitate the exchange of the molds by connecting them detachably to carriers upon the seat in the press and the movable head respectively; and partly, to permit the inversion or tilting of the head and the upper half of the mold after each pressing operation, to permit inspection of such part, and cleaning if necessary.

These objects are attained partly, by a particular construction for the fluid supply to the mold-carriers, partly, by a novel means of securing the mold-parts detachably in the press, and partly by making the head of the press movable laterally, and partially rotatable; so as to permit the tilting of the cope of the mold into a partially inverted and readily accessible position.

Such rotatability can be effected with a very slight separation of the mold-parts, by swinging the head and cope of the mold laterally from the bottom of the mold, to permit the removal of the molded article.

Previous to such lateral movement of the head, an ejector is operated through the center of the head to discharge the molded article from the cope, and after the cope has been moved away from the mold-bottom a stripper is actuated through such mold-bottom to lift the molded article from the mold.

The ultimate object is, of course, to press as large a number of articles as possible per hour in a given press; and this object is accomplished partly by making the mold-parts wholly accessible as soon as the article is molded, which is effected by the lateral and tilting movement of the head carrying the mold-cope, partly by provided means to readily detach the mold-parts from their carriers, partly by the provision of ejectors to automatically discharge the article from the mold-parts when molded, and partly, by furnishing to the mold-parts automatically operated connections to supply cold water and steam to the mold at the proper periods in a molding operation.

The hydraulic operation of various parts is also facilitated by providing auxiliary hydraulic agencies to restore such parts to an inoperative position after they have been actuated by a primary hydraulic agency.

The invention will be understood by reference to the annexed drawing, in which.

The bed $a$ has a seat on the top which carries the mold-bottom $a'$ which is supported upon a base A by two posts A', and is provided in the corners with guide-sockets $b$.

Figures 1, 10:
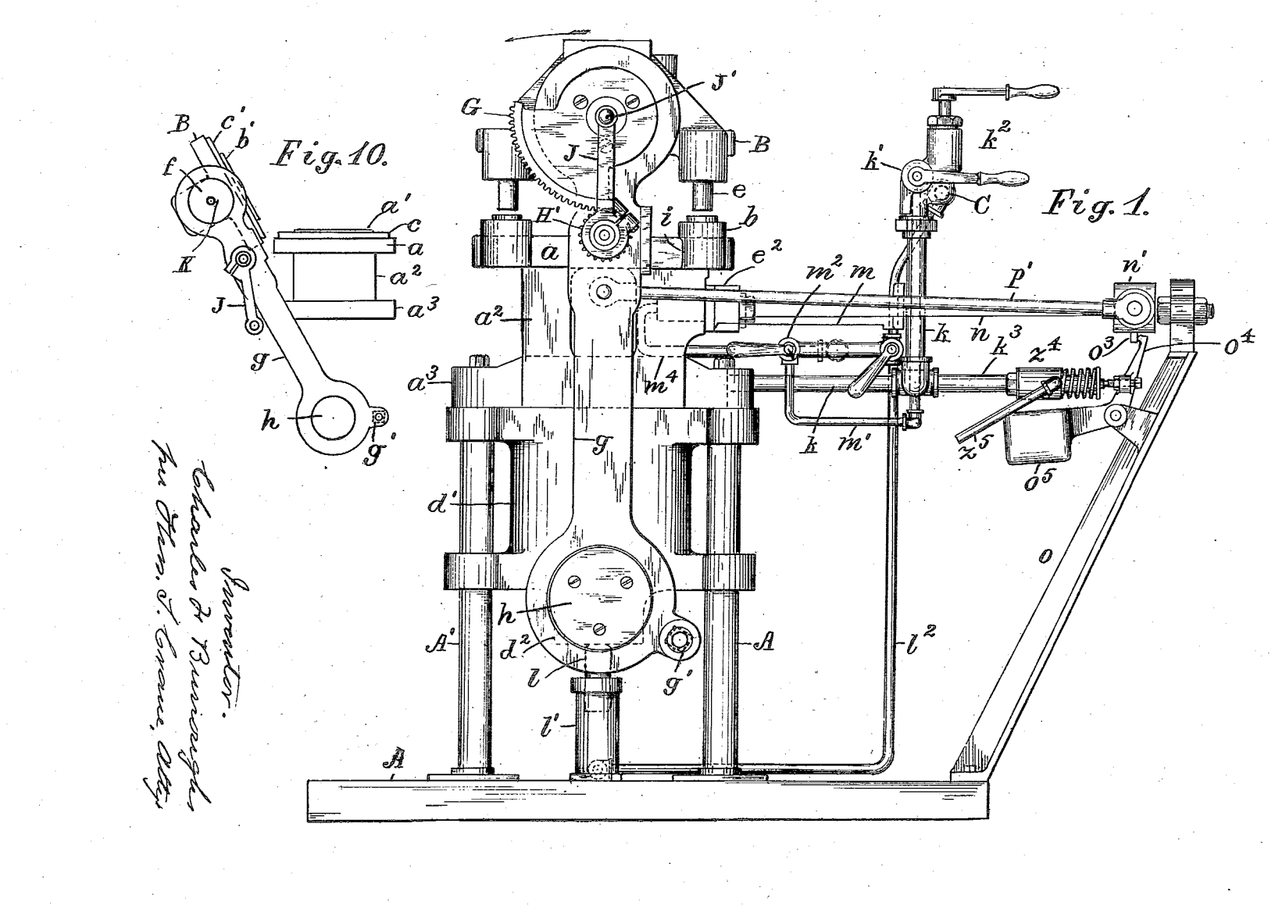
Figure 1 is a side elevation, and Fig. 2 a plan of the hydraulic connections for rocking the press-head laterally.
Fig. 10 is a side elevation of the mold-bed, with the movable head tilted to expose the top part of the mold.

The mold-bottom $a'$ is attached to a mold-carrier $c$ secured upon the bed, and a mold-top $b'$ to a mold-carrier $c'$ upon the tilting-head B, and the article to be molded is formed by placing the plastic material in or upon the mold-bottom when the head B is moved laterally; then moving the head over the mold, as shown in Fig. 1, and then operating a hydraulic cylinder to draw the head downward toward the bed. The head has guide-pins $e$ which enter the sockets $b$.

Prior to placing the material in the mold, the mold-carrier is heated by a suitable steam-supply which is cut off as the mold is operated, and replaced by a supply of cold water, so that as soon as the article is molded it will be chilled suitably for removal from the mold. The change from a heating to a cooling fluid is effected automatically as will be hereinafter described. The mold-parts are heated and cooled very quickly by their carriers.

For the operation of the press, supplies are required of cold water, steam, and fluid under hydraulic pressure, and three sets of pipes and valves are required for the distribution and operation of these fluids. The bed has a hydraulic piston $d$ projected from its lower side and a pressing-cylinder $d'$ is movable vertically upon the same, being guided by the posts A'.

The function of this movable hydraulic cylinder is to raise and lower the tilting-head B which carries the mold-top $b'$.

This head has journals $f$ pivoted in the upper ends of supporting arms $g$, which are journaled at the bottom upon studs $h$ at the ends of a crossbar $d^2$ forming part of the cylinder $d$. The arms are tied together next the studs by a cross-stop $g'$ which limits the lateral movement of the head B by its contact with the bottom of the cylinder $d$.

The bed $a$ has stops $i$ at opposite sides, to arrest the arms $g$ in their operative positions shown in Fig. 1, the arms and tilting-head being then movable vertically so as to press the mold-top $b'$ upon the mold-bottom $a'$ resting upon the bed. This is effected by introducing the hydraulic fluid under pressure from the hydraulic-main C through passage $d^2$ into the cylinder $d$ by means of pipe $k$ and supply-cock $k'$. During such molding operation, guide-pins $e$ upon the head B enter the guide-sockets $b$ and thus secure a perfect registry of the mold-parts.

When the molding is completed, the cock $k'$ is closed and the waste-cock $k^2$ upon the pipe $k$ is opened to discharge the pressure from the cylinder $d'$ (by pipe $k^3$), and the cylinder is then lifted with the arms $g$ and head B, by a small hydraulic piston $l$ operating beneath the cylinder $d$ in an auxiliary cylinder $l'$.

Figure 5:
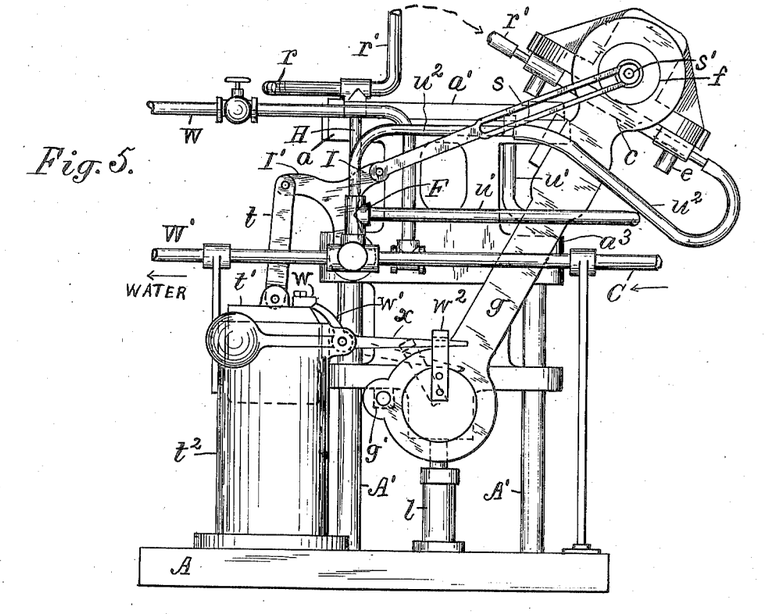
Fig. 5 is a side elevation, and Fig. 6 a plan of automatically operated valve-mechanism for supplying the mold-parts alternately with hot and cold fluid.

The hydraulic pressure is constantly exerted upon the cylinder $l'$ through the pipe $l^2$, so as to lift the cylinder $d'$ automatically when the pressure therein is discharged. The lifting of the head B clears the guide-pins $e$ from the sockets $b$ and permits the arms and head to be rocked away from the mold-bottom $a'$, as shown in Figs. 5 and 10.

To effect this, a hydraulic tilting-cylinder $m$ is attached to the bed $a$ and projected laterally between two guide-rods $n$, which are also attached to a block upon the bed and are supported at their outer ends by a leg $o$ projected upward from the base.

A piston $p$ is movable in the cylinder $m$ and attached to a crosshead $n'$ movable upon the guide-rods $n$, and having its outer ends connected by links $p'$ to the arms $g$ which carry the tilting-head B.

Pipes $m'$ and cock $m^2$ supply fluid under pressure from a main pipe C to the cylinder $m$, and the pressure upon the piston $p$ operates to push the piston-rod outward and to draw the arms $g$ into their vertical position at opposite sides of the bed $a$.

The difference of cross-section between the piston and the piston-rod forms a shoulder $o'$ upon the rod, and the outer end of the cylinder $m$ is constantly supplied with the hydraulic fluid by pipe $o^2$, so as to exert a constant tendency upon the shoulder to draw the piston inward and move the arms $g$ to their inoperative position shown in Fig. 5. Such tendency becomes operative when the cock $m^2$ is closed and a waste-cock $m^3$ connected to the waste-pipe $m^4$ is opened, discharging the pressure from the cylinder $m$.

To facilitate the connection of various attachments to the bed $a$, it is made with four columns $a^2$ upon its under side, which connect with a bottom plate $a^3$. The columns show in dotted lines in Fig. 2, and a block $e^2$ is attached to them at one side to sustain the cylinder $m$ and rods $n$. The piston $d$ is attached to the plate $a^3$, and the water is introduced into the cylinder $d'$ through the plate and the piston $d$, as shown at $d^2$ in Fig. 3.

The heating and cooling of the mold-parts with rapidity, and at precisely the required stage of the molding operation, greatly facilitates the molding of the articles, and I therefore effect this by connections between the rocking-arms $g$ and certain three-way valves $q$, $q'$, the stems $q^2$ of which are connected together and provided with a two-armed rocker I, I'.

Figure 4:
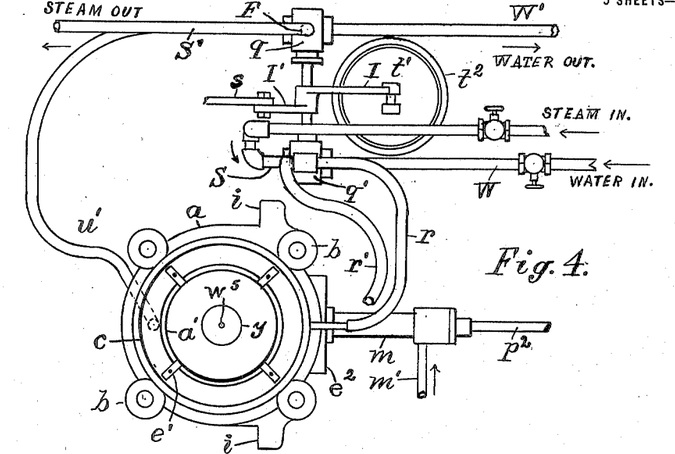
Fig. 4 is a plan of the connections for supplying the mold-parts alternately with hot and cold fluid.
Figure 6:
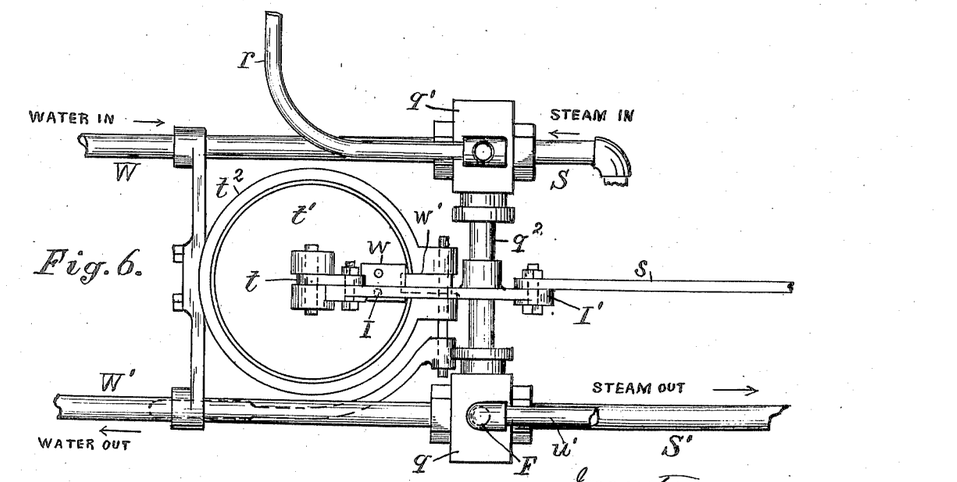

These three-way valves $q$, $q'$ are shown in Figs. 4, 5 and 6 for delivering the steam and hot water automatically to the mold-carriers $c$ and $c'$, and have their valve-stems $q^2$ connected together to move in unison, so that one delivery-port is opened when the other is closed.

These stems are provided with a rocker actuated by the movement of the arms $g$.

One side of the valve $q'$ is connected with a water supply-pipe W, and the opposite side with a steam supply-pipe S.

One side of the valve $q$ is connected with a waste water-pipe W' and the opposite side with a steam waste-pipe S'.

The outlet F from the valve $q$ has branches $u'$ and $u^2$ connected respectively with the inlets $s^2$ of the inner spaces in the mold-carriers, and the outlet from the valve $q'$ has branches $r$, $r'$, connected respectively with the outlets of the spaces in the two mold-carriers.

The rocker has two operative cranks I, I', one of which is connected by a slotted link $s$ to a stud $s'$ upon one of the journals $f$ of the tilting-head, and the other is connected by a link $t$ to the plunger $t'$ of a dash-pot $t^2$.

The plunger of the dash-pot is provided with a lug $w$, and a hinged latch $w'$ is provided on the dash-pot to engage the plunger when wholly raised, and hold it until the latch is operated.

A trip-finger $w^2$ is secured upon one side of the arms $g$ and operates when the arms are moved into a vertical position, to throw downward a handle $x$ which operates the latch, and thus permits the dash-pot plunger to fall. This rocks the three-way valves and operates them reversely, so as to shut off the steam-supply to the mold-parts and introduce cold water.

This dash-pot mechanism is automatically reset in its initial condition by the operation of the slotted link $s$, which is so proportioned in length that when the tilting-head is moved away from the mold-bed $a'$, as shown in Fig. 5, the rocker will elevate the plunger $t'$ to its highest point, which causes it to be latched by the latch $w'$, with the three-way valves operating to deliver steam to the mold-parts.

Such alternate application of the steam and hot water to the mold-parts is thus effected precisely at the time required, by the operation of the link $s$, and such automatic operation of the steam and cold water-supply is maintained, although the movements of the head B in pressing the mold, and the movement of the arms $g$ in retracting the head from the mold-bottom, are entirely under the control of the operator.

The head may be swung laterally when the guide-pins $e$ are lifted from their sockets $b$, and the head may then be rotated to tilt the mold-cope $b'$ into a fully exposed position, as shown in Fig. 10, which shows a few parts only.

This figure shows the arms $g$ and head B elevated by the action of the auxiliary hydraulic piston $l$, and the head swung laterally by the action of the piston $p$, and rotated by crank J to incline the mold-cope $b'$ upwardly, and thus render it perfectly accessible for cleaning or removal.

Figure 2:
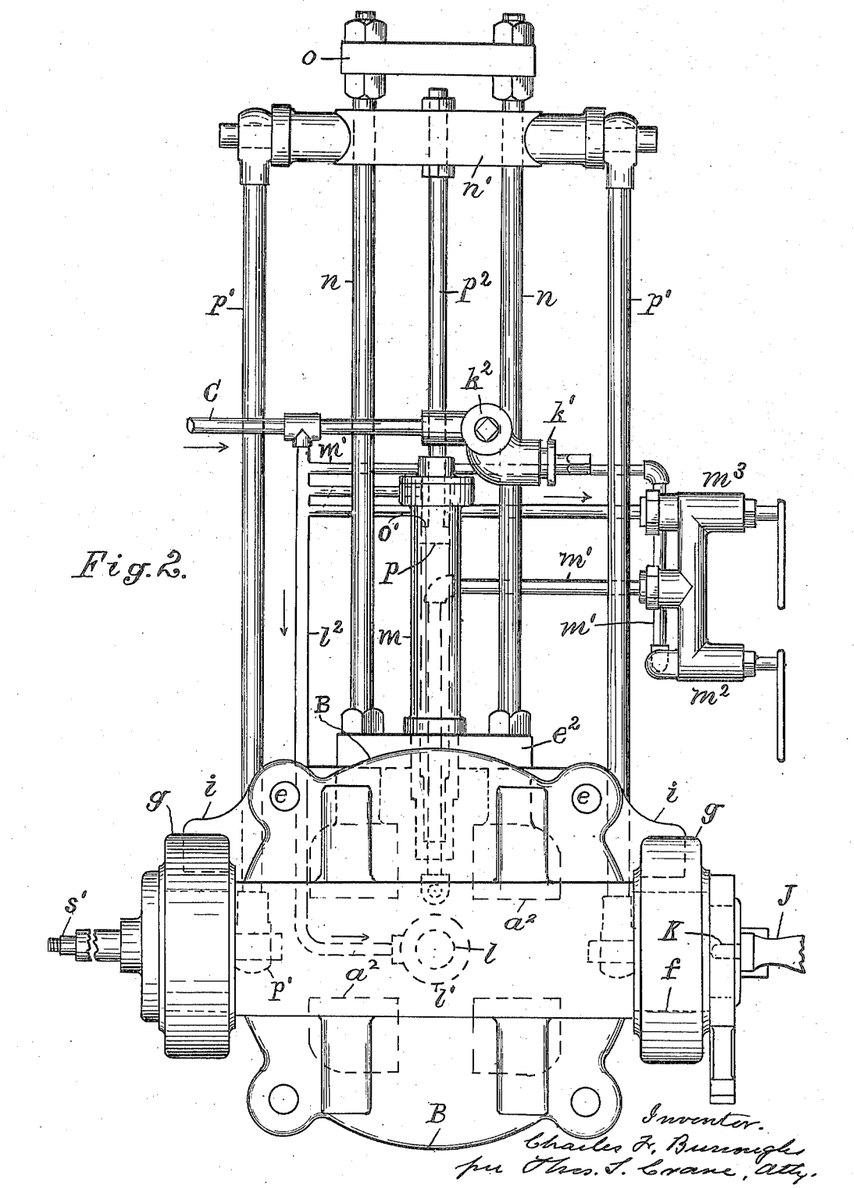
Figure 3:
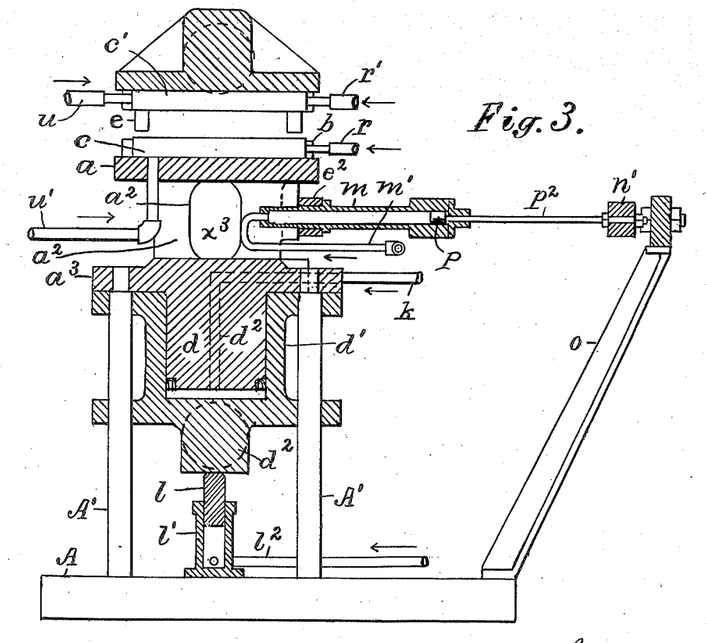
Fig. 3 is a vertical section of the hydraulic automatically operated parts on the middle line of Fig. 2.

In Figs. 1 and 2, a toothed segment G is shown attached to one of the journals $f$ upon the head $b$, and a pinion H' is mounted to turn upon the arm $g$, in mesh with the segment; and is provided with a hand-crank J having a spring-stud J' projected through it, to engage a gage-hole K in the end of the journal, which, with the stud, forms a stop for the head B in its operative position.

When the crank is turned until the stud engages the hole K, the gearing operates to set the head B exactly level, and in operative relation to the bed $a$.

It is necessary to eject or strip the molded article from the mold-parts before the head B is moved laterally to fully expose the lower part, as shown in Fig. 10; and ejectors are provided to operate independently in each of the mold-parts. These ejectors are shown in Figs. 2, 7, 8 and 9 only, the upper ejector-disk $z$ having an actuating rod $z'$ extended upwardly through the mold-carrier $c'$ and head B and provided with a spring $z^2$ to draw the disk closely into the mold.

A lever $z^3$ is hinged upon the head and extended across the top of the rod $z'$, and provided on its free end with a depending link $z^4$ having a hook $z^5$ at its lower end, arranged to hook under one edge of the bed $a$ when the head is over the same and pressed downward thereon.

Figures 7, 8, 9:
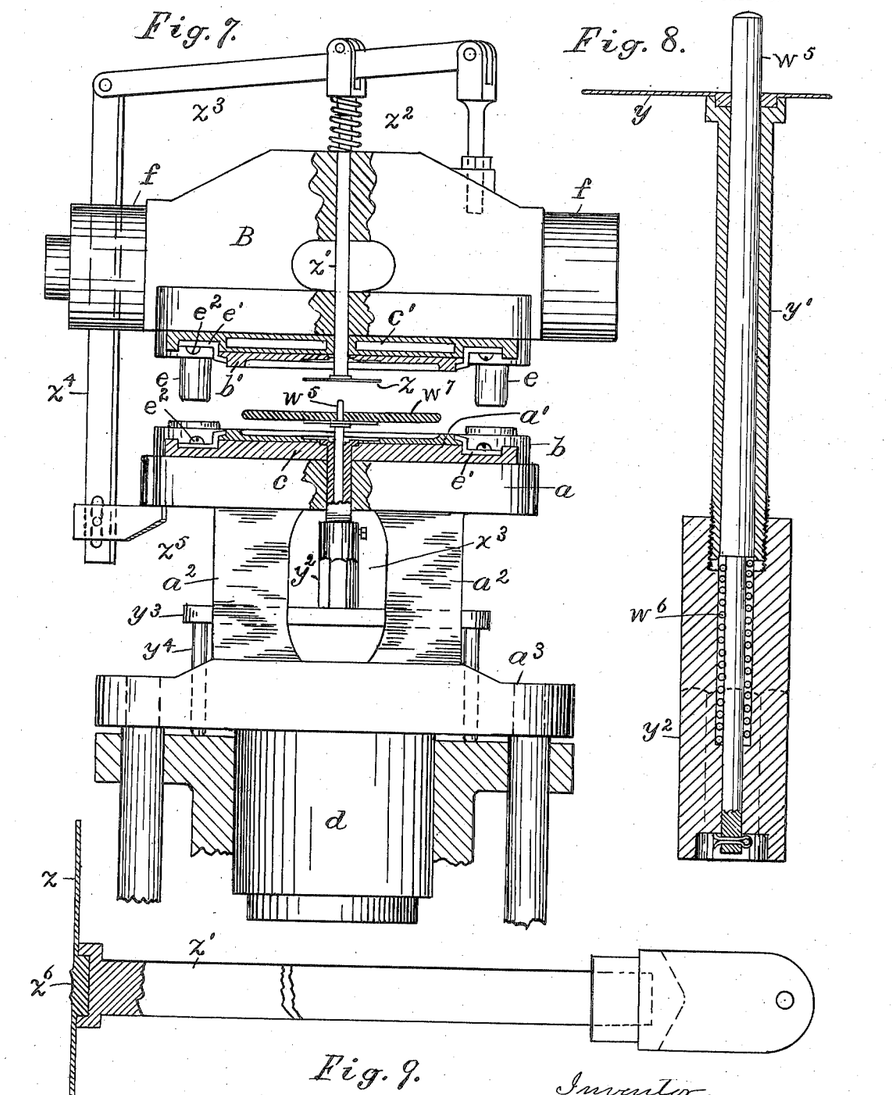
Fig. 7 is an end elevation of the parts carrying the ejectors, such parts being in section adjacent to the ejectors.
Fig. 8 is an enlarged view of the lower ejector in section at the center line where hatched.
Fig. 9 is an enlarged view of the upper ejector in section at the center line where hatched.

The first lifting of the head from the bed thus operates to pull the free end of the lever $z^3$ downward in relation to the rod $z'$, and presses the ejector out of the upper mold-part, as shown in Fig. 7. When the head is swung laterally, the hook disengages from the bed $a$, and the disk $z$ is drawn into the upper mold-part again by the spring $z^2$. The article between the two mold-parts is thus left in the lower part as the mold-cope is withdrawn.

The lower ejector is shown in the drawing designed to operate with a mold for molding disks of plastic material, $w^7$ and is combined with a centering spindle which forms a hole through the center of the disk when molded.

As shown in Figs. 7 and 8, the ejector $y$ is mounted upon a hollow shaft $y'$ which is extended downward through the mold-bottom and the bed $a$ into a space $x^3$ below such bed.

The centering spindle $w^5$ is fitted movably within the shaft $y'$ and pressed upward by a spring $w^6$ which holds it normally above the ejector, as shown in Fig 7. The bed being connected to a foot-plate $a^3$ by four integral posts or columns $a^2$ shown in Figs. 2 and 7, forms a space $x^3$ which permits the ejector-shaft $y'$ to connect with certain operative members. A shank $y^2$ is screwed adjustably upon the lower end of the shaft $y'$ and contacts with a transverse lifter-bar $y^3$ having push-pins $y^4$ extended through the plate $a^3$ to contact with the top of the cylinder $d'$, as shown in Fig. 7, to be actuated by its movements.

When the cylinder is pushed upwardly by the piston $l$ at the close of the molding operation, it operates through the bar $d^4$ to lift the head $b$ from the bed $a$, and finally pushes the lifter-bar $y^3$ upwardly and raises the ejector $y$ from the mold, thus lifting the molded disk $w^7$ from the mold-bottom, as shown in Fig. 7.

The upper ejector $z$ has (see Fig. 9) a concavity $z^6$ to which the top of the spindle $w^5$ is fitted, and which pushes the spindle down when the mold is closed, with the spindle in position to form a perforation in the center of the molded disk.

The upward movement of the cylinder $d'$ is limited by its contact with the foot-plate $a^2$, and it thus lifts the shank $y^2$ through the same space at each actuation.

The elevation of the ejector $y$ can, however, be varied by screwing the bottom of the shaft, more or less, into the top of the shank, and locking it therein by any suitable means, as the set-screw $y^3$.

From the above description it will be seen that my construction permits the freest possible access to the mold-parts for filling the mold, for cleaning the parts after the pressing operation, and for changing the mold-parts and substituting others when required.

It also supplies the hot and cold fluids automatically to the mold-parts exactly when required, while leaving the operator free, through the manual control of the cylinder $d'$ and the piston $p$, to open and close the mold, and to move the upper mold-part clear from the lower mold-part at pleasure, and to vary or regulate the duration of the pressing operation, as may be found necessary.

It will be understood that the press may be used with any form of mold to which it is adapted, the invention being illustrated herein in connection with mold-parts $a'$ and $b'$ for molding disks of plastic material.

These mold-parts are shown connected detachably to the mold-carriers $c$ and $c'$ by removable clamp-block $e'$ shown in Figs. 7 and 10, which clamp-blocks grip the margin of the mold-part and may be detached (as by removing a screw $e^2$ in each), and similar mold-parts substituted; the mold-parts in all cases being centered upon the mold-carriers by any suitable means.

The mold-carrier $c'$ is shown in Fig. 7 with an interior space for the circulation of the hot and cold fluids, and the mold-parts for the disk are made thin to change their temperature readily.

Any construction for the carrier may be employed which will heat and cool it alternately, so as to heat and cool the thin mold-parts which are carried thereby.

It is obvious that injury would be done to the press if the water were introduced into the pressing-cylinder $d'$ and the arms $g$ pulled downwardly (by opening the cock $k'$) when the head B is moved away from the seat $a$, as shown in Fig. 10.

In the proper manipulation of the apparatus, the cock $k'$ is never opened except the head B is in its operative position over the seat on the bed $a$, as shown in Fig. 1; but means is provided to warn the operator if he should inadvertently open the cock $k'$ when the head B is not in its operative position.

Such means consists of a normally open waste-valve $z^4$ and an ejector-pipe $z^5$, from which water is squirted toward the operator if the valve $k'$ is opened at any time except the arm $g$ be vertical. Such jet of water plainly indicates to the operator that the valve $k'$ should be closed until the arms $g$ are moved to a vertical position.

The valve is held normally open by a lever $o^4$ and weight $o^5$.

Means is required to close the waste-valve automatically when the head B is in its operative position, so that the opening of the valve $k$ at such time may operate the pressing-cylinder when desired. Such means consists of a lug $o^3$ upon the cross-head $n'$, which is arranged to press upon the end of the lever $o^4$ when the cross-head $n'$ reaches its outer position.

This position of the parts is shown in Fig. 1, the weight $o^5$ being raised by such movement of the lever, in readiness to again open the valve when the cross-head moves to shift the head B from its operative position.

Such closing of the valve coincides with the movement of the head B directly over the seat $a$, and thus renders it safe for the pressing-cylinder $d'$ to be operated by the opening of the valve $k'$.

Having thus set forth the nature of the invention what is claimed herein is:

1. A molding-press having a seat to support the mold-bottom, a head operated to move the mold-cope to and from such bottom in the pressing operation and movable laterally from the mold-bottom to expose the same and having means for tilting such head to turn the mold-cope into an accessible position.

2. A molding-press having a seat to support the mold-bottom, arms extended downward at opposite sides of the seat and pivoted at their lower ends, a tilting-head having journals pivoted in the upper ends of the arms and carrying the cope for the mold, and means for rotating or tilting the head upon its journals.

3. A molding-press having a stationary seat to support the mold-bottom, a head movable to and from the mold-bottom during the pressing operation, arms extended downward from opposite sides of the head and connected to a crossbar, constantly acting hydraulic means to lift the crossbar and arms, hydraulic means of greater power for moving the crossbar downward to press the mold-parts together, hydraulic means for rocking the arms to shift the mold-cope laterally, and manually operated valves for regulating the fluid movements for such hydraulic operations.

4. A molding-press having a stationary bed and seat to support the mold-bottom, a head movable to and from the mold-bottom during the pressing operation, arms extended downward from opposite sides of the head and connected to a crossbar, constantly acting hydraulic means to lift the crossbar and arms, hydraulic means of greater power for moving the crossbar downward to press the mold-parts together, means for rocking the arms to move the head laterally over the mold-bottom, a three-way plug-valve supplied with steam and cold-water pipes, a link connecting the crank of such valve with the arms of the head, whereby the valve is turned when the head is moved laterally from the mold-seat, so as to discharge water-pressure from the mold-parts and admit steam-pressure thereto, and when the head is moved over the mold and pressed downward thereon the valve is turned to discharge the steam-pressure from the mold-parts and supply the cooling water thereto, to chill the contents of the mold.

5. A molding-press having a stationary seat to support the mold-bottom, a head movable to and from the mold-bottom with the mold-cope during the pressing operation, hydraulic means for pressing the mold-parts together, an inlet and outlet upon each of the mold-parts for heating and cooling fluid, two three-way valve-plugs provided respectively with cold water and with steam-supply and having their outlets connected to the inlets of the mold-parts and having connection also with the outlets of such mold-parts, a rocker having cranks connected with the stems of the said valves to move them simultaneously for opposed operation, a dash-pot having its plunger connected with one of the said cranks, a latch for holding the plunger lifted and a link connecting the rocker with the movable head of the press to turn the valves before and after the operation of the mold, and means connected with the movable head for tripping the dash-pot and permitting the automatic movements of the valve at the beginning of the molding operation to automatically cut off the steam-supply therefrom and supply cold water thereto.

6. A molding-press having a seat to support the mold-bottom, arms extended downward at opposite sides of the seat and connected to a crossbar, a tilting-head having journals pivoted in the upper ends of the arms and carrying the cope for the mold, means for rotating or tilting the head upon its journals and a stop for arresting the head when adjusted to press toward the mold-bottom.

7. A molding-press having a base with a stationary bed supported thereon to carry the mold-bottom, arms extended downward at opposite sides of the bed, a tilting-head movable to and from the mold-bottom to carry the mold-cope and having journals upon its ends pivoted to the upper ends of the arms, means for rotating the head upon its journals, a hydraulic piston projected downwardly from the bed, a hydraulic cylinder movable thereon and having a crossbar with studs upon the ends, arms connecting the journals of the movable head with the studs upon the cylinder, stops upon the bed to set the arms with the tilting-head above the mold, and a stop-bar connecting the arms to contact with the cylinder and limit the rocking movement of the arms.

8. A molding-press having a stationary seat to support the mold-bottom, a head carrying the mold-cope movably to and from the mold-bottom during the pressing operation, arms extended downward from opposite sides of the head and connected to a crossbar, hydraulic means for moving the crossbar downward to press the mold-parts together, an ejector extended through the head and the mold-cope, and a lever and latch connected with such ejector, the latch being arranged and operated to automatically press the ejector through the molds to expel the molded article as the cope is lifted from the mold-bottom.

9. A molding-press having a stationary seat to support the mold-bottom, a head carrying the mold-cope movably to and from the mold-bottom during the pressing operation, an ejector extended through the head and the mold-cope, means for lifting the head from the mold-bottom and moving it laterally, and means carried by the head for automatically operating the ejector while lifting the head from the mold-bottom.

10. A molding-press having a seat to support the mold-bottom, arms extended downwardly at opposite sides of the seat and connected to the crossbar, a tilting-head having journals pivoted in the upper ends of the arms and carrying the cope for the mold, means for rocking the arms upon the crossbar, a toothed segment upon one of the journals of the tilting-head, a pinion rotatable upon the arm in engagement with such segment, a crank for turning the pinion to tilt the head, and means connected with the crank for arresting its movement when the head is adjusted to press toward the mold-bottom.

11. A molding-press having a stationary seat to support the mold-bottom, a head provided with a mold-top and movable to and from the mold-bottom, arms extended downward from opposite sides of the head, a hydraulic pressing-cylinder connected to the arms for moving them downwardly to press the mold-parts together, a manually operated valve with pipe for supplying fluid to the pressing-cylinder, a normally open waste-valve connected with the said pipe and provided with a water-ejector, a tilting-cylinder and cross-head for rocking the arms to move the head laterally from the mold-bottom, and means operated by the cross-head when the arms are vertical for closing the said waste-valve.

In testimony whereof I have hereunto set my hand.

CHARLES F. BURROUGHS.